Figure 1:
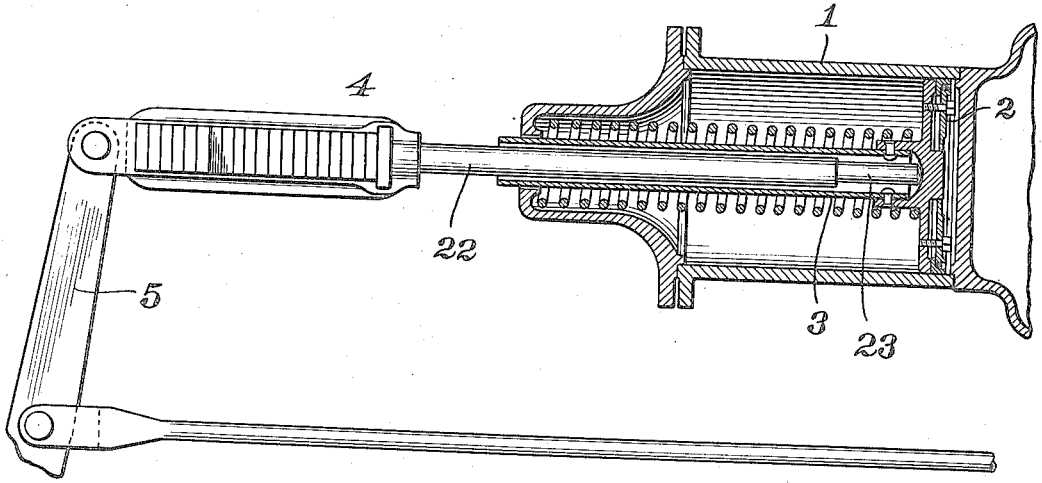

G. CHRISTENSON.
SLACK TAKE-UP FOR FLUID PRESSURE BRAKE SYSTEMS.
APPLICATION FILED JAN. 9, 1915.

1,158,177.

Patented Oct. 26, 1915.
2 SHEETS—SHEET 1.

G. CHRISTENSON.
SLACK TAKE-UP FOR FLUID PRESSURE BRAKE SYSTEMS.
APPLICATION FILED JAN. 9, 1915.
1,158,177.
Patented Oct. 26, 1915.
2 SHEETS—SHEET 2.
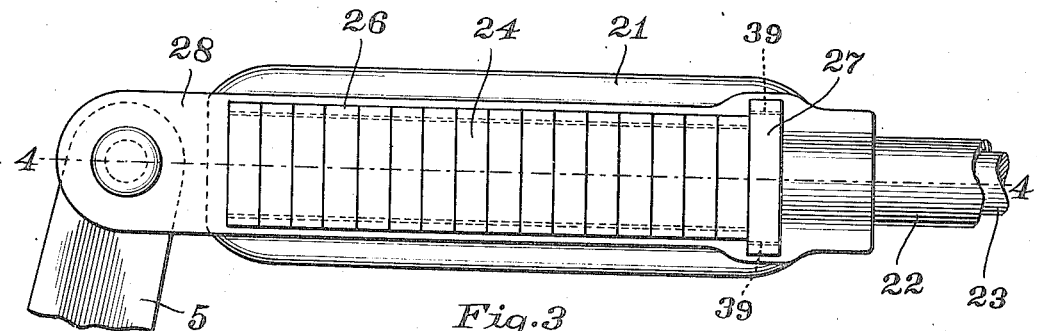
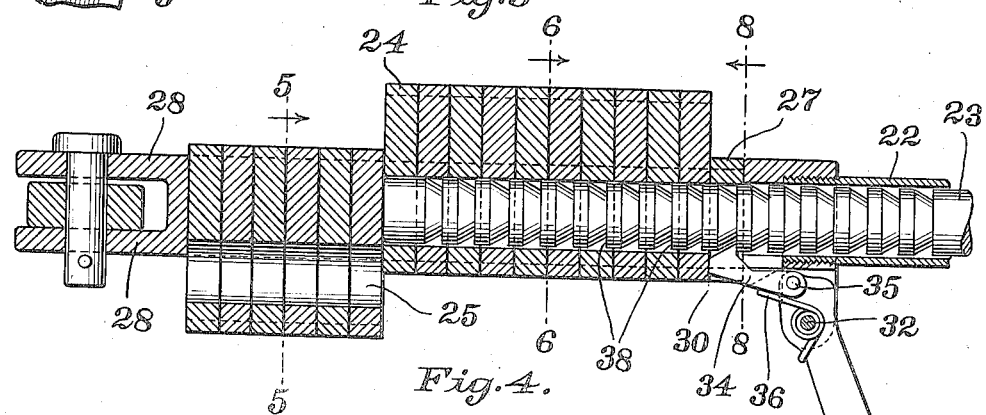
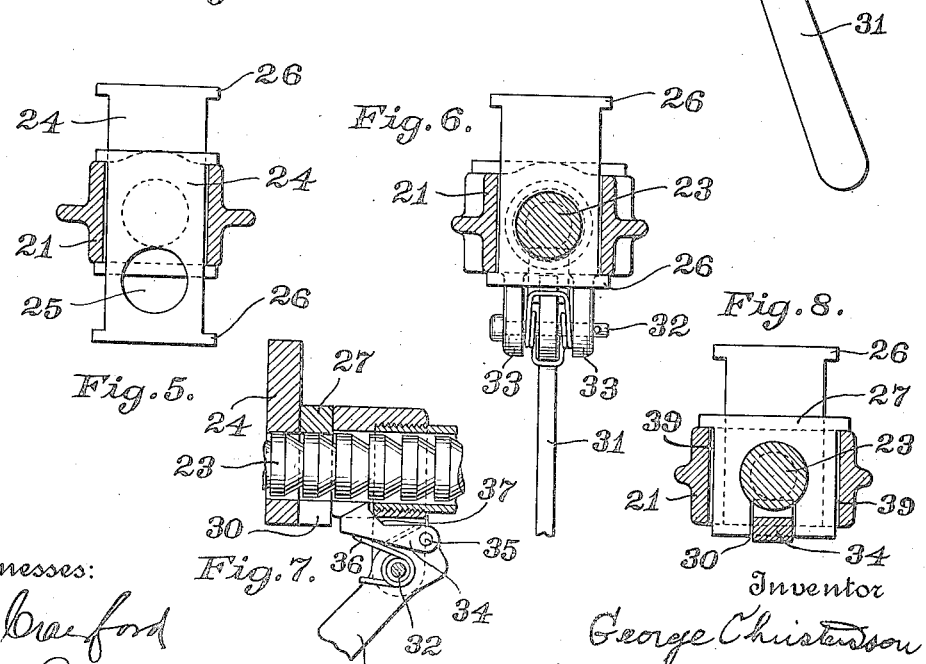
Witnesses:
M. G. Crawford
A. L. Pumphrey
Inventor
George Christenson
By his Attorney

UNITED STATES PATENT OFFICE.

GEORGE CHRISTENSON, OF JAMAICA, NEW YORK, ASSIGNOR TO H. W. JOHNS-MANVILLE COMPANY, A CORPORATION OF NEW YORK.

SLACK TAKE-UP FOR FLUID-PRESSURE-BRAKE SYSTEMS.

1,158,177. Specification of Letters Patent. Patented Oct. 26, 1915.

Application filed January 9, 1915. Serial No. 1,399.

*To all whom it may concern:*

Be it known that I, GEORGE CHRISTENSON, a citizen of the United States of America, residing at Jamaica, county of Queens, State of New York, have invented certain new and useful Improvements in Slack Take-Up for Fluid-Pressure-Brake Systems, of which the following is a specification.

My invention relates to fluid pressure brake systems such as the familiar air-brake systems now in use and has for its object the production of a simple and efficient device by which the different degrees of slack existing in the apparatus on different cars may be readily taken up while the brake systems are under tension, and a standard amount of piston travel thereby accurately insured on all the cars in the shortest possible time.

As is well known the varying thickness of brake shoes, as the result of different periods of use, and the varying distances of travel in the application of brakes resulting from different conditions of springs produced by varying loads on freight cars, seriously interfere with the maintaining of the uniform standard of piston travel in the ordinary air-brake system. The existence of uneven piston travel upon the different cars of a long train creates uneven brake action thereon, as is well known, and not only causes jolting of the trains upon sudden brake applications, but may result in breaking the train in two. Moreover, excess piston travel very greatly reduces the effectiveness of a given brake application, causing the air pressures in brake cylinder and auxiliary reservoir to equalize at a much reduced figure.

Various kinds of automatically operating devices have been employed for taking up the slack of the brake system created by wear of the brakes shoes, and also various arrangements in which said brake rigging may be disconnected at some point or other by an operative and lengthened or shortened by an amount which the operative deems sufficient to readjust the same, but according to my invention a simple and efficient device is applied to the system, preferably at or near one of the points of connection of the brake levers to the cylinder and piston, by which the slack may be taken up to an accurately determined degree while the brakes are applied and without danger to the operator, who merely has to reach under the middle of the car to the apparatus and does not have to disconnect or otherwise manipulate any parts of the brake rigging which would be subjected to tension. Consequently, if a heavier application of the brakes were inadvertently made or the condition of the system otherwise changed during the adjusting operation, no injury could result either to operator or apparatus.

The best form of apparatus at present known to me embodying my invention, is illustrated in the accompanying two sheets of drawings in which—

Figure 2:
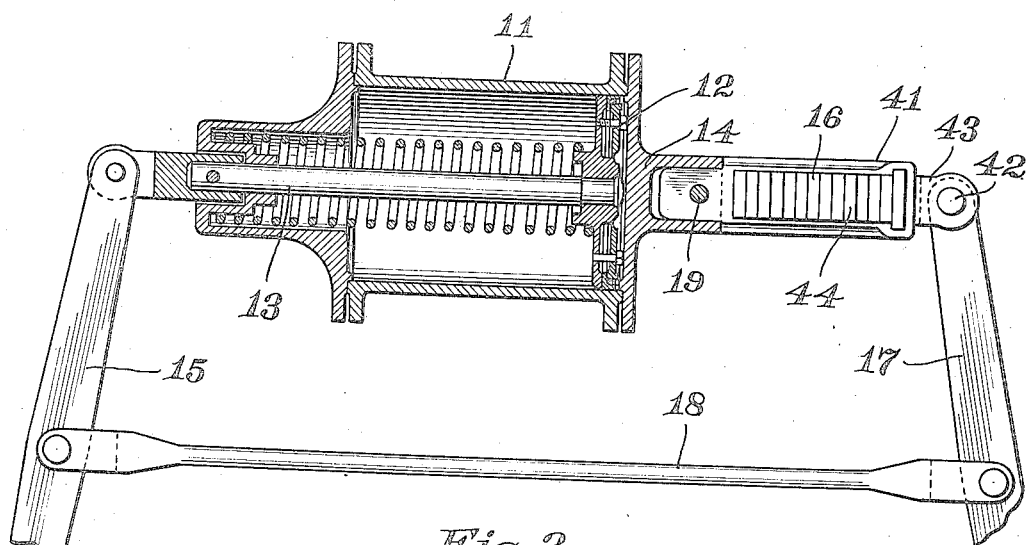

Figure 1 is a plan view and horizontal section of a portion of brake rigging and brake cylinder of the type used on freight cars, with my invention applied thereto, certain parts being broken away. Fig. 2 is a similar view of the type of rigging used on passenger cars with my invention applied thereto. Fig. 3 is a detail on larger scale of the telescoping push rod used for freight car rigging, parts being broken away. Fig. 4 is a vertical central section on line 4—4 of Fig. 3. Fig. 5 is a vertical cross section on line 5—5, of Fig. 4. Fig. 6 is a similar section on line 6—6 of Fig. 4. Fig. 7 is a detail vertical section similar to Fig. 3 showing the operating pawl in releasing position, and Fig. 8 is a detail view of the last shim or keeper, being a cross section taken on line 8—8 of Fig. 4.

Throughout the drawings like reference characters indicate like parts.

Referring to Fig. 1, 1, is the air brake cylinder, 2, the piston having the hollow piston rod 3, and 5, a brake lever, all of standard construction. In accordance with my invention I substitute for the simple push rod which in accordance with standard practice telescopes into the hollow piston rod 3, and is pivoted to the brake lever 5, a special telescoping push rod generally represented by 4. This telescoping push rod 4, consists of the rectangular frame 21, provided at one end with ears 28, 28, to which the brake lever 5, may be pivoted and at the other end with an interiorly threaded opening into which the tubular extension 22, is screwed. Through the tubular extension 22, which is of an exterior diameter adapting it to slide into the hollow piston rod 3, there loosely slides a notched rod 23. Within the rectangular frame 21, are confined a series of shims or perforated blocks 24, 24, which blocks are free to slide up and down in said frame but are prevented from moving beyond a certain position by reason of the stops or horizontally projecting lugs 26, 26, formed on either end of each shim. Each of the shims is also perforated with an opening 25, large enough to receive the rod 23, all the openings in all the shims being located in the same relative position, and in line with rod 23, when the shims are in their uppermost position, as well shown in Fig. 4. There are enough of these shims to fill up the entire length of the space in the frame 21, lacking one, and this space is filled by a keeper 27, which is made shorter and wider than the shims and has its perforation 29, so placed that it will be in line with the push rod when the keeper is in its lowermost position in the frame, and which keeper has its lower end slotted as shown at 30, to permit the passage of the pawl 34, which is designed to engage the notches 38, 38, on the rod 23. These notches are preferably made in the shape of annular recesses cut around the rod 23, as clearly shown in Figs. 4 and 7. The frame 21, is cut away at 39, 39, to receive the keeper 27, and permit the passage of the stops or lugs 26, 26, of the shims.

On the under side of the end of the rectangular frame 21, nearest the brake cylinder, is pivoted the adjusting lever 31, by means of pin 32, set in ears 33, 33, or equivalent device. To the upper end of this lever, pawl 34, is pivoted as at 35. Any convenient form of spring 36, is provided for holding the pawl upward in engagement with the notches 38, of the push rod 23. This not only insures engagement of the pawl when the adjusting lever is operated, but it also causes it to act as a lock against any shifting of rod 23, when loose as a result of the brake rigging being slack while brakes are relieved. A beveled face 37, on the pawl is adapted to engage the frame 21, and withdraw the pawl from engagement with the push rod notches when the adjusting lever 31, is thrown into the extreme position indicated in Fig. 7. Also, when the lever is released, spring 36, forces it forward, and pawl 34, back against the series of shims and packs them together so that they will not rattle.

With the construction above described the operation is as follows: The parts are assembled as shown in Fig. 1, the tubular extension 22, of the frame 21, being preferably just long enough to extend throughout the length of the hollow piston rod 3, and the rod 23, being just long enough to extend throughout the tubular extension 22, and the rectangular frame 21. When the rod 23, is pushed all the way into frame 21, and its tubular extension 22, all of the shims 24, would be lifted and the notched portion of the rod 23, would extend through all of the openings 25, in said shims. An oscillation of the adjusting lever 31, to the right in the position shown in Fig. 4, will cause the pawl 34, to reach back and snap up into one of the notches 38, in rod 23. Normally it is held in this position by spring 36, as before described. An oscillation of the lever 31, to the left will then cause said pawl to pull the rod 23, outwardly a distance equal to the distance between the faces of any two successive notches (usually a half an inch) before the pawl becomes disengaged, but any further vibration of said lever would cause the beveled surface 37, to engage the frame 21, and withdraw the pawl from engagement with the notch, as shown in Fig. 7. Before the pawl releases the rod 23, however, the latter will have traveled far enough to permit one of the shims 24, to drop down behind its end and so hold it in its extended position. In Figs. 1 and 4, six of the shims are shown to have been successively dropped into such lower position behind the rod 23. The effect of this is to increase the effective length of the telescoping push rod 4, by forcing out rod 23, and to take up the corresponding amount of slack in the brake rigging, limiting the piston travel under an application of standard pressure to a corresponding extent.

In practice, therefore, the brake inspector would merely have to signal the engineer to make a light application of the brake sufficient to put the brake rigging of each car under a light tension, and then walk along the train, noting the piston travel which has occurred on each car and oscillating the adjusting lever 31, of the rigging of each car a sufficient number of times to lengthen the telescoping push rod by an amount sufficient to force the piston back into the cylinder to a degree which will bring it to the standard position of travel for that degree of pressure of air in the cylinder, and then after the brake rigging on all of the cars had been thus standardized, signal the engineer to release his brakes and to proceed with his train. To adjust the brake rigging on a detached car, or whenever for any reason a supply of compressed air for a light brake application is not obtainable, the adjusting lever 31, should first be operated until the piston is forced against the cylinder head, the slack of the brake rigging has been taken up, and the brakes set hard. Then a number of fallen shims whose combined thickness equals the amount of standard piston travel desired, can be lifted, (the rod 23 being held away from the shims and on the pawl 34, while this is done) and, the pawl 34, being tripped, the yoke or frame 21, will be forced inward by the recoil of the brake rigging, so that rod 23, will pass through the lifted shims and come to a bearing against those not lifted, all the parts thus being placed in the proper position of adjustment to produce the desired standard amount of piston travel the next time the brakes are applied in service.

In the case of the standard type of brake rigging for passenger cars shown in Fig. 2, where the use of a solid piston rod would make the application to the piston of my telescoping push rod somewhat awkward, I prefer to make said telescoping push rod an adjustable fulcrum for the lever which is pivoted to the cylinder head. As shown, in Fig. 2, 11, represents the cylinder; 12, the piston; 13, the piston rod, and 14, the usual lug cast on the cylinder head for pivoting the rear brake lever 17, while 15, represents the front brake lever, 16 the adjustable fulcrum supplied by my invention, 18 the usual tie rod, and 19 a bolt or pin by which the adjustable fulcrum is connected to the lug 14. In this modification, as in the form described for freight equipment the adjustable device consists of a rectangular frame 41, containing a series of perforated shims 44, through which frame and shims runs a notched rod 43, (the end of which alone shows in Fig. 2) which is pivoted to lever 17, by pin 42. The adjusting lever and other parts are arranged as shown in Figs. 4, 6 and 7, but are hidden from view in Fig. 2. The method of operating this device is identical with that described with reference to the freight equipment.

When the brake shoes are worn down and have to be replaced by new ones, or for any other reason it is desirable to let out slack in the brake rigging, the operator partly oscillates the adjusting lever 31, sufficiently to relieve the pressure of the end of the rod 23, upon the shims which have fallen down behind it, and some or all of said shims are then lifted so as to bring the holes in them in line with the rod. The pawl is then tripped or disabled as shown in Fig. 7, and any light pressure on the rod forces it inwardly through the holes in the shims which have been raised into proper alinement.

In disassembling the parts of the telescoping push rod, the rod 23, is withdrawn from engagement with the shims and keeper, the keeper is slid out transversely, and the shims are slid along the rectangular frame until they come, one by one, opposite the cutaway portions 39, 39, thereof, formerly occupied by the keeper, and are then, each in turn, slid out transversely from engagement with the frame. In assembling the parts, the above described process is reversed. As soon as the end of rod 23, passes into the perforation in the keeper, the latter is locked against movement transversely of the frame 21, and it in turn locks the shims against movement longitudinally of the frame.

The advantages of my invention comprise its simplicity and freedom from liability to disarrangement as well as its rapidity and safety of operation. If the shims tend to stick in any one position by reason of rust, dirt, or ice, they can be readily knocked free by a blow from a hammer or, in case of ice, it can be melted by a momentary application of the flame of a blow torch. The operation being manual, and not automatic, any disarrangement of this kind becomes obvious immediately to the operator and can be remedied, whereas in an automatic device it would be hidden until the train was on its way and then disable the adjusting device. If too heavy a brake application is made when the inspector is making his adjustments, or if for any other reason the operative cannot produce the necessary movement by pulling on the lever 31, directly, it is a simple matter to lengthen the same sufficiently by slipping a longer piece of gas pipe over it. The adjustment being performed under tension of the brake rigging the exact degree of piston travel desired can be secured with certainty and all this can be done without danger to the operator.

The underlying principle of my invention is the introduction into the line of brake rigging, at some convenient point, of a telescoping connection which can be expanded gradually while the rigging is under tension by the action of compressed air in the cylinder, thereby forcing the piston back until the desired predetermined amount of piston travel for that degree of air pressure is established, and then automatically locking the parts of the telescoping member in the position then existing. Obviously this result could be obtained by other arrangements and locations of the telescoping member, than that herein illustrated, by other devices for producing relative motion of the parts, and by other devices for locking the parts in the adjusted position, without departing from the principle and substance of my invention.

Having described my invention, I claim:

1. In a take-up apparatus for fluid pressure brake systems, a telescoping push rod composed of a plurality of relatively movable parts adapted for coöperation with the piston, in combination with an adjusting lever adapted for manual operation pivoted on one of said parts and operatively connected to another.

2. In a take-up apparatus for fluid pressure brake systems, a telescoping member inserted in the line of brake rigging connections, composed of a plurality of relatively movable parts in combination with an adjusting lever adapted for manual operation pivoted on one of said parts and having a pawl and ratchet connection with another part.

3. In a take-up apparatus for fluid pressure brake systems, a telescoping member, inserted in the line of brake rigging connections, composed of a frame, a series of transversely movable, perforated shims mounted in said frame, a longitudinally movable rod mounted in said frame and adapted to pass through the perforations in the shims when said perforations are in line therewith, and manually operated means for forcing said rod away from said shims.

4. In a take-up apparatus for fluid pressure brake systems, a telescoping member, inserted in the line of brake rigging connections, composed of a frame, a series of transversely movable, perforated shims mounted in said frame, a longitudinally movable rod mounted in said frame and adapted to pass through the perforations in the shims when said perforations are in line therewith, and manually operated means for forcing said rod away from said shims by a step-by-step movement.

5. In a take-up apparatus for fluid pressure brake systems, a telescoping member, inserted in the line of brake rigging connections, composed of a frame, a series of transversely movable, perforated shims mounted in said frame, a longitudinally movable rod mounted in said frame and adapted to pass through the perforations in the shims when said perforations are in line therewith, and manually operated means for forcing said rod away from said shims by a step-by-step movement, comprising a lever pivoted on the frame, a pawl connected to the lever, and notches formed in the rod adapted to coöperate with said pawl.

6. In a take-up apparatus for fluid pressure brake systems the combination of rectangular, horizontally disposed frame having a perforation in one end, a rod loosely mounted in said perforation, a series of vertically movable shims mounted in said frame having perforations in line with the rod when said shims are in their uppermost position but out of line therewith when in their lowermost position, and means for limiting the vertical movement of said shims so that they may not be removed from engagement with the frame, when in operative position therein.

7. In a take-up apparatus for fluid pressure brake systems, the combination of rectangular, horizontally disposed frame having a perforation in one end, a rod loosely mounted in said perforation, a series of vertically movable shims mounted in said frame having perforations in line with the rod when said shims are in their uppermost position but out of line therewith when in their lowermost position, and means for limiting the vertical movement of said shims so that they may not be removed from engagement with the frame when in operative position therein, comprising horizontally projecting lugs on both upper and lower ends of said shims.

8. In a take-up apparatus for fluid pressure brake systems the combination of rectangular, horizontally disposed frame having a perforation in one end, a rod loosely mounted in said perforation, a series of vertically movable shims mounted in said frame having perforations in line with the rod when said shims are in their uppermost position but out of line therewith when in their lowermost position, and means for limiting the vertical movement of said shims so that they may not be removed from engagement with the frame, when in operative position therein, together with a manually operated lever pivoted on said frame and means connected to said lever for intermittently gripping the rod.

9. In a take-up apparatus for fluid pressure brake systems the combination of rectangular, horizontally disposed frame having a perforation in one end, a rod loosely mounted in said perforation, a series of vertically movable shims mounted in said frame having perforations in line with the rod when said shims are in their uppermost position but out of line therewith when in their lowermost position, and means for limiting the vertical movement of said shims so that they may not be removed from engagement with the frame when in operative position therein, together with a manually operated lever pivoted on said frame and means connected to said lever, for intermittently gripping the rod, said last mentioned means comprising a spring pressed pawl pivoted to the lever, and coöperating notches formed in the rod.

10. In a take-up apparatus for fluid pressure brake systems the combination with the cylinder and piston, of an expansible, telescoping push rod for the piston, means for holding the rod in various positions of expanded adjustment, and manually operated means for producing said adjustments.

11. In a take-up apparatus for fluid pressure brake systems the combination of a frame attached to one element of the brake system, a rod movable longitudinally with reference to the frame and connected to another element of the brake system, means for holding the rod in various positions of adjustment with reference to the frame, and manually operated means for producing said adjustments comprising a lever pivoted to the frame, a spring pawl connected to the lever, and coöperating teeth on the rod.

12. In a take-up apparatus for fluid pressure brake systems the combination of a frame attached to one element of the brake system, a rod movable longitudinally with reference to the frame and connected to another element of the brake system, means for holding the rod in various positions of adjustment with reference to the frame, and manually operated means for producing said adjustments comprising a lever pivoted to the frame, a spring pawl connected to the lever, and coöperating teeth on the rod, said pawl being provided with means for disengaging it from the teeth in the rod at the will of the operator.

13. In a take-up apparatus for fluid pressure brake systems the combination of a frame attached to one element of the brake system, a rod movable longitudinally with reference to the frame and connected to another element of the brake system, means for holding the rod in various positions of adjustment with reference to the frame, and manually operated means for producing said adjustments comprising a lever pivoted to the frame, a spring pawl connected to the lever, and coöperating teeth on the rod, said pawl being provided with means for disengaging it from the teeth on the rod at the will of the operator, said last mentioned means consisting of a beveled face on the pawl, adapted to bear on a portion of the frame when the lever is moved toward the limit of its oscillation.

14. As an element in a take-up apparatus for fluid pressure brake system the combination of a rectangular frame having a perforation at one end and partly cut-away portions adjacent thereto, a rod adapted to slide in said perforation, a series of perforated shims movable transversely in said frame provided with lugs at either end limiting their transverse movement except when opposite said cutaway portions, and a slotted keeper adapted to fill said cutaway portions in the frame, and interlock with said rod against transverse movement when all parts are in operative position.

15. In an air brake system the combination with the usual brake rigging, cylinder, and piston connected to the brake rigging and movable in the cylinder, of means for adjusting the position of the piston relatively to the brake rigging by positively forcing the same inwardly in the cylinder while the brakes are set.

16. In an air brake system the combination with the usual brake rigging, cylinder, and piston connected to the brake rigging and movable in the cylinder, of means for adjusting the position of the piston relatively to the brake rigging by positively forcing the same inwardly in the cylinder while the brakes are set and automatic means for holding said piston in any position of adjustment so produced.

17. In a take-up apparatus for fluid pressure brake systems, the combination of rectangular, horizontally disposed frame having a perforation in one end, a rod loosely mounted in said perforation, a series of vertically movable shims mounted in said frame having perforations in line with the rod when said shims are in their uppermost position but out of line therewith when in their lowermost position, and means for applying yielding pressure to the entire series of said shims, to prevent their rattling, when not being moved.

18. In a take-up apparatus for fluid pressure brake systems, the combination of rectangular, horizontally disposed frame having a perforation in one end, a rod loosely mounted in said perforation, a series of vertically movable shims mounted in said frame having perforations in line with the rod when said shims are in their uppermost position but out of line therewith when in their lowermost position, and means for applying yielding pressure to the entire series of said shims, to prevent their rattling, when not being moved, said means comprising a spring pressed pawl mounted on the frame and adapted to coöperate with the rod, but normally forced against the end shim when at rest.

GEORGE CHRISTENSON.

Witnesses:
A. PARKER-SMITH.
M. G. CRAWFORD.